G. C. RAEGER.
EXPANSION STUD BOLT.
APPLICATION FILED AUG. 20, 1915.

1,234,487. Patented July 24, 1917.

WITNESSES
Frank C. Palmer
Theo. G. Hoster

INVENTOR
George C. Raeger
BY
ATTORNEYS

UNITED STATES PATENT OFFICE.

GEORGE C. RAEGER, OF WATERLOO, NEW YORK.

EXPANSION STUD-BOLT.

1,234,487.

Specification of Letters Patent.   Patented July 24, 1917.

Application filed August 20, 1915.   Serial No. 46,498.

*To all whom it may concern:*

Be it known that I, GEORGE C. RAEGER, a citizen of the United States, and a resident of Waterloo, in the county of Seneca and State of New York, have invented a new and Improved Expansion Stud-Bolt, of which the following is a full, clear, and exact description.

The invention relates to expansion and fastening devices, such as shown and described in the Letters Patent of the United States, No. 1,146,651, granted to me on July 13, 1915.

The object of the present invention is to provide a new and improved expansion stud bolt more especially designed for use in concrete walls, posts and other structures.

The expansion stud bolt consists essentially of an expansible member adapted to be inserted in a hole in the structure, and a bolt having a driving and locking member adapted to be driven into the said expansible member to expand the latter in the hole and to be fastened to the said expansible member to maintain the bolt in position outside of the hole.

A practical embodiment of the invention is represented in the accompanying drawings forming a part of this specification, in which similar characters of reference indicate corresponding parts in all the views.

Figure 1:
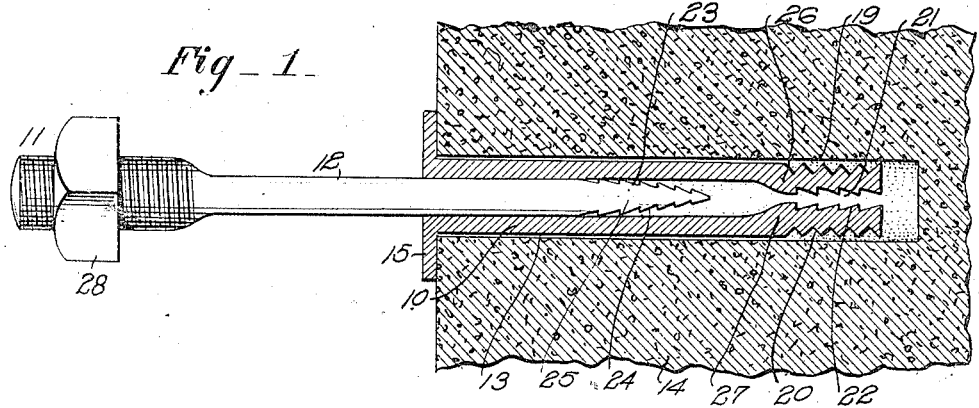
Figure 1 is a sectional side elevation of the expansion stud bolt as applied and with the bolt in position prior to driving it home.
Figure 2:
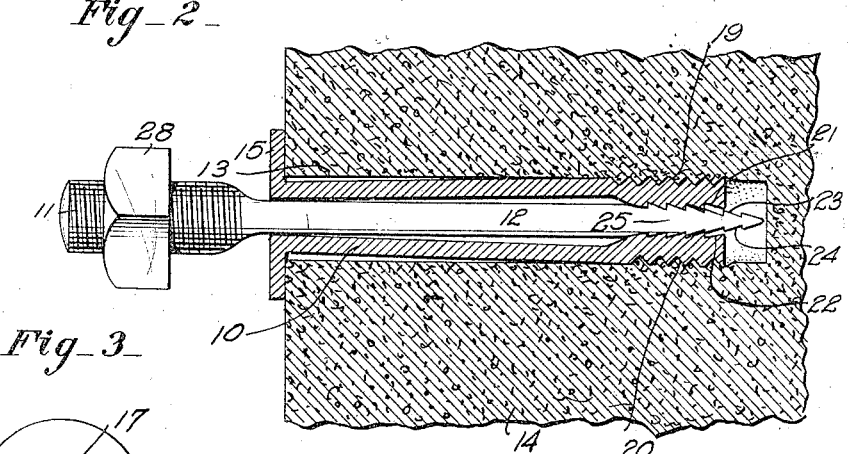
Fig. 2 is a similar view of the same with the parts in final position.
Figure 3:
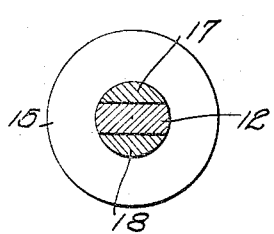
Fig. 3 is a cross section of the expansion stud bolt.
Figure 4:
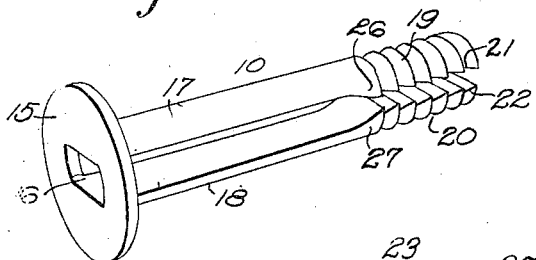
Fig. 4 is a perspective view of the expansible member.
Figure 5:
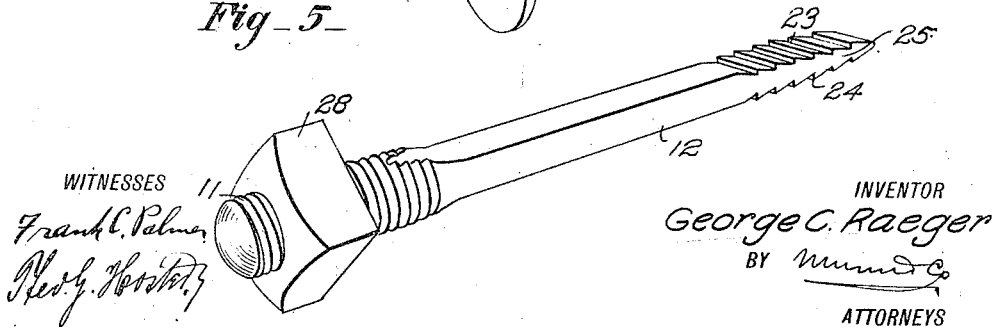
Fig. 5 is a similar view of the stud bolt provided with the driving and locking member.

The expansion stud bolt consists essentially of two parts, namely, an expansible member 10 and a stud bolt 11 having a driving and locking member 12 for expanding the expansible member 10 in a hole 13 formed in a concrete wall, post or other structure 14. The expansible member 10 consists of a head 15 adapted to abut against the outer face of the structure 14, as plainly shown in Figs. 1 and 2, and the said head is provided with an aperture 16 of approximately rectangular shape through which passes the driving and locking member 12, of like configuration in cross section, as plainly shown in Figs. 3 and 5. From the head 15 at opposite sides of the aperture 16 extend jaws 17 and 18 provided near their terminals with exterior teeth 19 and 20, adapted to embed themselves in the wall of the hole 13 on expanding the jaws 17 and 18 on driving the member 12 home, as shown in Fig. 2. The jaws 17 and 18 are provided at their free ends on opposite faces with teeth 21 and 22, adapted to be engaged by teeth or barbs 23, 24 formed on opposite faces of the tapering terminal 25 of the member 12. The jaws 17 and 18 are provided at their opposite faces immediately in front of the teeth 21, 22 with inclines 26, 27 adapted to be engaged by the tapering terminal 25 of the member 12 to spread the jaws 17 and 18 apart at the time the stud bolt 11 and its member 12 are driven home, as will be readily understood by reference to Fig. 2. It will be noticed that the teeth 21, 22 and 23, 24 are preferably of ratchet form and engage one the other to securely hold the stud bolt 11 and its member 12 against outward movement, thus securely holding the stud bolt in position in the member 10 and securely holding the member 10 expanded in the hole 13 of the structure 14. It will also be noticed by reference to Fig. 2 that by the arrangement described the stud bolt 11 with its nut 28 is maintained in position outside of the face of the structure 14 to permit the use of this stud bolt for whatever purposes it is intended to be used.

In using the device, the expansible member 10 is inserted in the hole 13 and then the driving and locking member is passed through the opening 16 and a blow is given to the outer end of the stud bolt 11 to drive the latter and the member 12 home. It will be noticed that in driving the member 12 home its tapering end spreads the toothed ends of the jaws apart and embeds the exterior teeth 17 and 18 in the wall of the hole 13 to securely fasten this member 10 in position in the structure. At the same time the teeth or barbs of the member 10 engage the interior opposite teeth of the jaws so that the member 12 and the stud bolt 11 are locked in position on the member 10.

The expansion stud bolt shown and described is very simple and durable in construction and can be readily applied to walls of concrete or other material and to other structures and without danger of the stud bolt becoming loose when subjected to a severe strain.

Having thus described my invention, I claim as new and desire to secure by Letters Patent:

1. An expansion stud bolt, comprising an expansible member and a bolt having a driving and locking member, the said expansible member having an apertured head and jaws extending from the said head on opposite sides of the aperture in the head, the inner ends of the jaws being spaced apart a less distance than the remainder of the jaws and having teeth on their inner and outer faces and inclined on said inner faces adjacent the teeth, and the said driving and locking member being adapted to pass through the head aperture between the said jaws, the outer end of the said driving and locking member being tapering and provided with teeth adapted to engage the said opposite jaw teeth.

2. An expansible stud bolt, comprising an expansible member having an apertured head and jaws extending from the head and having thickened inner ends provided with teeth on their inner and outer faces, and a bolt having a wedge shaped inner end provided with teeth on its opposite faces.

In testimony whereof I have signed my name to this specification in the presence of two subscribing witnesses.

GEORGE C. RAEGER.

Witnesses:
THEO. G. HOSTER,
GEORGE H. EMSLIE.